United States Patent [19]

Morgenstern

[11] Patent Number: 5,047,715
[45] Date of Patent: Sep. 10, 1991

[54] ELECTROMAGNETIC DEVICE FOR POSITION MEASUREMENT HAVING MULTIPLE COILS WITH EQUAL AREA OF TURN CROSS-SECTION

[76] Inventor: Jürgen Morgenstern, Im Heidewinkel 33, 4000 Düsseldorf 12, Fed. Rep. of Germany

[21] Appl. No.: 288,247

[22] Filed: Dec. 22, 1988

[30] Foreign Application Priority Data

Dec. 22, 1987 [DE] Fed. Rep. of Germany ....... 3743500

[51] Int. Cl.$^5$ .......................... G01B 7/14; H01F 5/00; H01F 27/28
[52] U.S. Cl. .......................... 324/207.17; 324/207.26; 343/788; 343/742; 343/867; 336/220; 336/230; 336/231; 336/188
[58] Field of Search .............. 324/207, 208, 234, 236, 324/227, 244, 247, 259, 260–262, 330, 332, 334; 343/788, 867, 742; 336/230, 231, 188, 220, 225, 115

[56] References Cited

U.S. PATENT DOCUMENTS

| | | | |
|---|---|---|---|
| 1,905,216 | 4/1933 | Capps | 336/220 X |
| 2,093,158 | 9/1937 | Pratt | 343/867 |
| 2,285,091 | 6/1942 | Holsten | 336/188 X |
| 2,291,450 | 7/1942 | Case | 343/867 X |
| 2,442,310 | 5/1948 | Polydoroff | 343/867 X |
| 2,460,806 | 2/1949 | Carter | 343/867 |
| 3,439,256 | 4/1969 | Kähne | 324/208 X |
| 3,440,542 | 4/1969 | Gautney | 343/788 X |
| 3,800,213 | 3/1974 | Rorden | 324/254 X |
| 4,314,251 | 2/1982 | Raab | 324/208 X |
| 4,489,330 | 12/1984 | Marutake et al. | 343/742 |
| 4,584,577 | 4/1986 | Temple | 324/208 X |

FOREIGN PATENT DOCUMENTS

| | | | |
|---|---|---|---|
| 2732950 | 2/1979 | Fed. Rep. of Germany | 324/207.16 |
| 636696 | 12/1978 | U.S.S.R. | 336/188 |

*Primary Examiner*—Gerard R. Strecker
*Assistant Examiner*—Warren S. Edmonds
*Attorney, Agent, or Firm*—Fleit, Jacobson, Cohn, Price, Holman & Stern

[57] ABSTRACT

An electromagnetic device for inductive position measurements for eliminating both the disadvantage of a limited measuring range and the disadvantage of superimposed interference voltages in the event of directional changes by providing a probe having a plurality of winding axes having coils with turn diameters which are greater, as the distance from the center of the probe increases. This creates the possibility of filling the entire probe volume with turns, and an almost complete independence from the direction of the probes relative to one another is shown for distance measures.

10 Claims, 5 Drawing Sheets

ELECTROMAGNETIC DEVICE FOR POSITION MEASUREMENT HAVING MULTIPLE COILS WITH EQUAL AREA OF TURN CROSS-SECTION

BACKGROUND OF THE INVENTION

The invention relates to an electromagnetic device for position measurements of the type.

Such an electromagnetic device is known from German Offenlegungsschrift 27 32 950. According to this publication, there are provided both for the transmitter and for the receiver in each case three coils perpendicular to one another which are operated with currents of the same frequency, which are dephased relative to one another by 90°, and by means of a stage of differing frequency. In this way, voltages are induced in the receiver which experience amplification, rectification, summation and further processing. The axes of the coils may coincide at one point, but be also disposed offset to one another. A coil cross disposed on one plane may be enclosed by an enveloping coil having an axis perpendicular thereto. By means of an arrangement comprising a receiver and a transmitter, the distance of the probes from one another should thereby be continuously detected independently of torsion and in a contact-free manner.

Range measurements undertaken with the known probe can, however, only be evaluated at close-range for distances between 1 to 21 cm. Beyond this range, the measured values are no longer meaningful. The measuring results are moreover sensitive with regard to the angular position of the probes relative to one another. Angle variation measurements undertaken without range measurements show for these probes a high degree of spread, with anisotropy additionally superimposed, so that measurements of the relative angular position cannot be evaluated.

BRIEF SUMMARY OF THE INVENTION

Proceeding from this, the basic aim of the invention is to develop further the described device to the extent that, on the one hand, it permits clear measurements over a wider range and, on the other hand, it eliminates variations in the range result caused by changes in the angle positions between transmitter and receiver or, if the distance is not to be detected, it provides clear information with regard to the alignment of the receiver and transmitter.

The invention achieves this aim and is regularly used in the probe of the transmitter while the probe of the receiver may either be fashioned in an identical manner to that of the transmitter or alternatively need only comprise a single coil.

A preferred area of application of the invention is for monitoring parturition as the probes can be very small and light in construction. For vaginal examination during labor, an external stationary transmitter can be used while the receiver is located inside the glove on the tip of the probing finger so that the dimensions can be recorded when palpating the opening of the mouth of the womb or of the pelvis. The probe may also be fastened to the head of the foetus, permitting external monitoring of its position.

Whereas the coils in previously known devices are cylindrically wound in a conventional manner, the proposal of the invention allows an increase in the number of turns, as the distance from the center of the probe increases, beyond what is possible with cylindrical winding so that with the same external volume of the probe a greater number of turns may be achieved overall. At the same time, the turn diameter is in each case the mean diameter of a single turn which need not necessarily, as is the case with cylindrical winding, be circular. The shape of the turns may equally well be rectangular. In this case, the total perimeter of a single turn is taken as the basis for determining an equivalent diameter.

In a particularly advantageous manner, all coils of the probe are wound in such a manner that the turns of respective successive coils enclose one another. Only the inner coil is excluded from such an enclosure.

It is surprisingly possible, because of the greater number of turns, not only to generate correspondingly stronger magnetic fields permitting detection of substantially wider measuring ranges, but also virtually to eliminate the dispersions and anisotropic interference caused by directional changes. If, therefore, the probe of the transmitter is rotated through 360° relative to the probe of the receiver, with the distance unchanged the receiving signal, which is evaluated in a known manner, remains practically constant whereas the signal of the known probe is subject to the interference described.

For most applications a probe is expedient which has coils wound about three axes perpendicular to one another with the proviso that the outer volume of the probe is filled up by the turns. A cube is particularly suitable in this case as a wrap element. The overlapping turns of the individual coils automatically produce the most compact arrangement. In the interests of achieving a magnetic field which is uniform in all directions, the coils are wound so as to produce identical areas of cross-section of turn for each of them. This means, for example, with regard to the cube to be wrapped, that the inner winding has more turn layers than the middle one, which in turn has more turn layers than the outer one.

The coil system is not, however, restricted to only three axes perpendicular to one another and may alternatively have more than three axes and, consequently, more than three coils, so that the magnetic field is even more uniform.

As a means of operation, the electrical device known from prior art may be used. This means that the magnetic field of each coil can be chronologically periodically built up for measuring and can be detected by the probe of the receiver.

When the probe is constructed with a hollow core, micro-chips can be mounted on the inner wall and, in the case of construction with a core, on its outer wall and fixed there using an appropriate adhesive. These allow the supply line of the probe to be a simple three-core cable, even with a large number of coils, in that it is possible in a known manner using the multiplex method to trigger the individual coils in a differentiated manner with respect to time. Triggering by means of currents differing in phase and/or frequency is used in a known manner. The use of several micro-chips in different positions allows triggering of the micro-chip disposed in the most favorable position in an electrical sense relative to the field lines so that interference by the field lines is avoided.

A probe having only one coil is quite sufficient to receive the electromagnetic field since directional independence is guaranteed. Again to achieve a maximum signal value, the construction of the probe for the receiver is appropriate it identical to that for the transmitter since, in this way, the signals of the individual coils can be vectorially summed.

The probe may be constructed with a very low volume particularly if the lapped turn layers are applied alternately so that the turns, which enclose one another, of the individual coils penetrate one another.

During the measuring process, the three coils of the transmitting unit are excited in such a manner that the voltages induced by each transmitting coil in the receiving system can be separately recorded. This may be achieved, for example, by staggered excitation or by excitation using differing frequencies for the transmitting coils. The relative spatial position (including rotation) from the transmitting to the receiving system is then calculated from the measured induced voltages.

To generate an extremely symmetrical measuring signal, it is finally possible to provide a plurality of coils which are wound on a sphere over the respective maximum circle and which then overlap at various points. Each of these coils then has its own polar axis passing through the center of the sphere.

The range of application of the invention can be substantially extended if a square wave pulse generator with an increased pulse amplitude is used as an alternating voltage generator. In this way, the probe may be briefly acted upon by extremely high currents which, because of their brevity, cannot cause any damage. Such pulses with a long succeeding quiescent period also improve the signal-to-noise ratio and are physiologically acceptable because burns as a result of overheating are avoided.

DESCRIPTION OF THE DRAWINGS

A more detailed description of the invention will now be presented with reference to the accompanying drawings, wherein.

DETAILED DESCRIPTION

Figure 1:
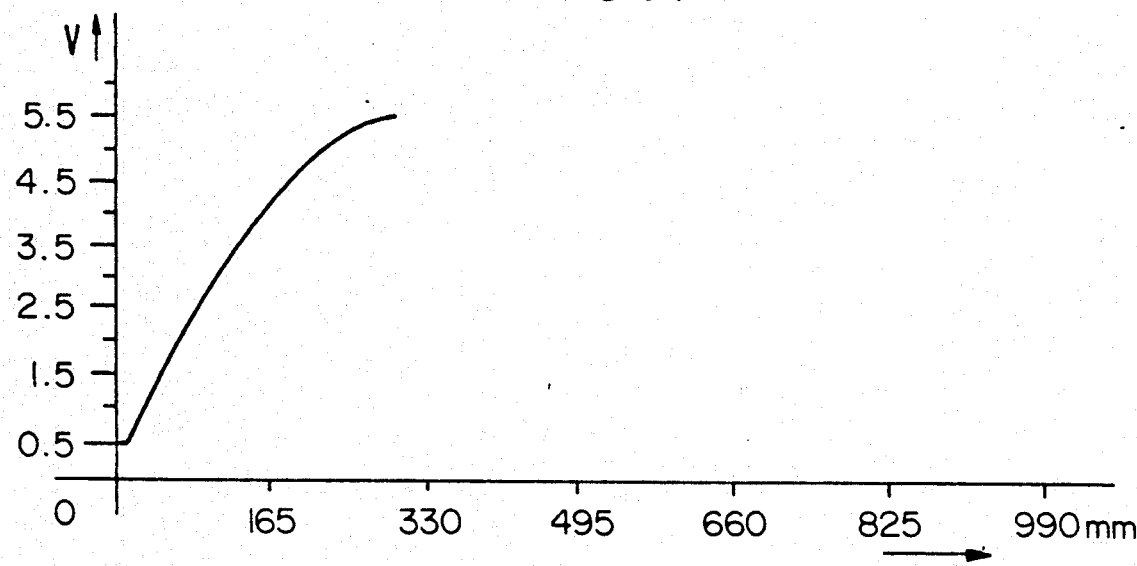
FIG. 1 is a graphic illustration showing the course of the signal voltage in dependence upon the measured distance in a device having a probe of known construction.
Figure 2:
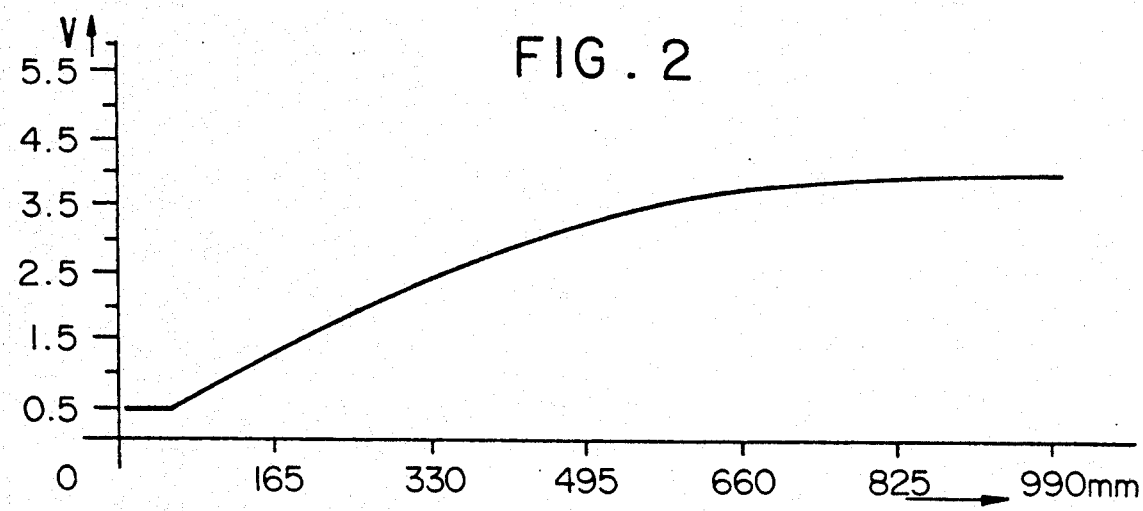
FIG. 2 is a representation corresponding to that of FIG. 1 but with respect to a device using the probe according to the invention.
Figure 3:
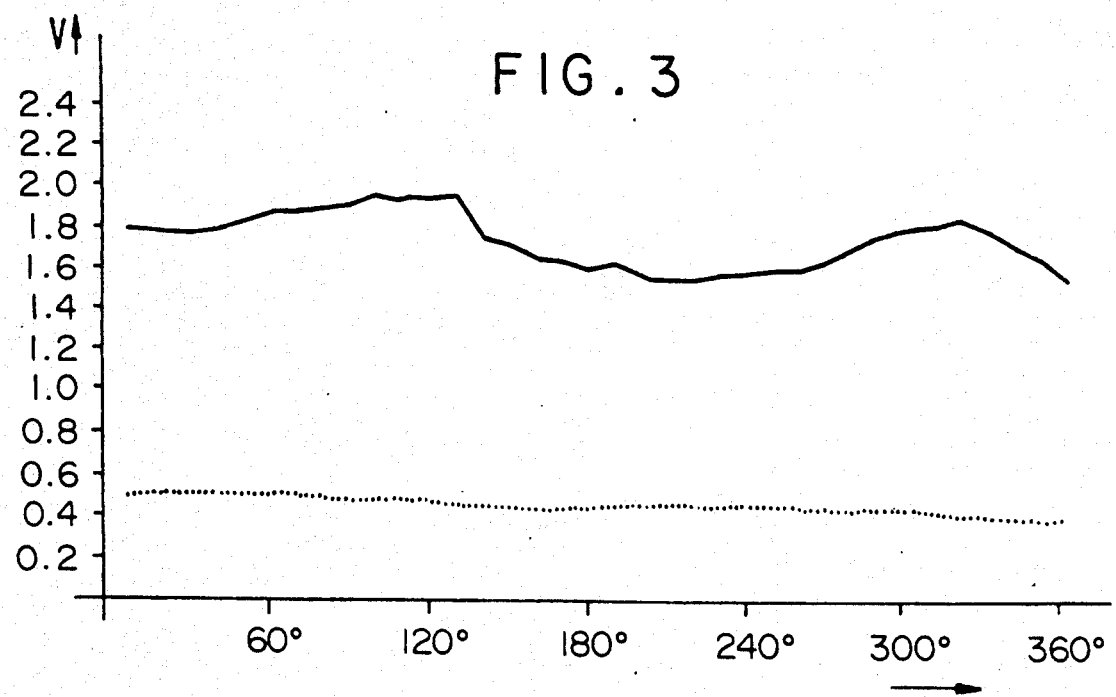
FIG. 3 is a graphic illustration showing a comparison of the measuring signal on rotation of the receiver relative to the transmitter for a device having the known probe and a device according to the invention.

FIGS. 1 to 3 show signal voltages for a device operated in each case with a constant current. In FIGS. 1 and 2, the abscissa is divided into units of distance while, in FIG. 3, it represents the angle of rotation between the transmitter and receiver probes. In FIGS. 1 to 3, $$V = (V_{Ref}/V_R)^{\frac{1}{3}}$$

was plotted on the ordinate in volts with $V_{Ref}$ = reference voltage $V_R$ = vector sum = $\sqrt{V_X^2 + V_Y^2 + V_Z^2}$.

Thus, the output voltage V is a positive d.c. voltage which is proportional to the distance.

In the case of the voltage curve of FIG. 1 measured using the known device, it is still possible under favorable conditions to arrive at a signal capable of evaluation using measurement techniques up to a distance of 211 mm. Beyond this upper distance limit, the signal voltage becomes increasingly flatter, no longer providing any reliable information about the distance.

Compared with this, FIG. 2, for which the device according to the invention was used, shows under otherwise identical conditions a curve still capable of evaluation up to a range of 660 mm.

The unbroken upper curve of FIG. 3 shows the influence of the angle of rotation between the transmitter and receiver probes in the known device. There are clearly extreme deviations which are superimposed, in the region of approximately 120° and 330°, by an anisotropy. The dotted curve shown below this shows the signal voltage using the device according to the invention. Surprisingly, this shows an almost constant course for the signal voltage when the transmitter and receiver probes are rotated relative to one another.

Figure 4:
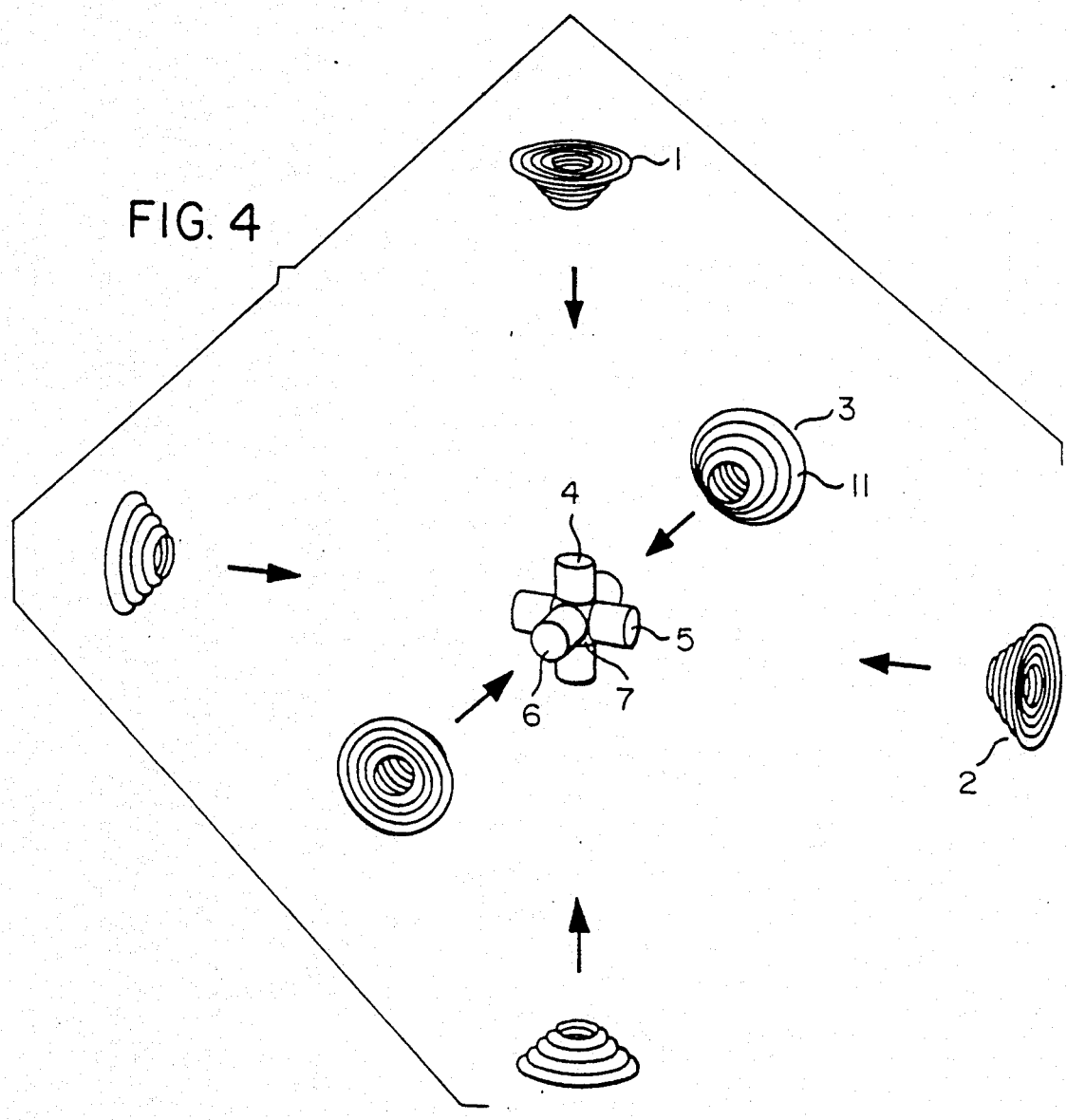
FIG. 4 is a diagrammatic perspective view of a first embodiment of the invention.

FIG. 4 shows a centrally disposed ferrite cross with the cores extending in the direction of the axes 4,5 and 6 which are perpendicular to one another. All the cores have a common point of intersection in the center 7 of the probe. The coils 1,2, and 3, which are each proportioned symmetrically to one another, can be slid onto the individual cores. It is evident that, as the distance from the center 7 of the probe increases, the turns assume a greater diameter. In the state where the coils are inserted on the ferrite cross, the probe volume is substantially filled, the turns 11 provided with the largest diameter being located outside. In this case, the probe is substantially characterized by the cross formed by the turn axes 4,5 and 6, as FIG. 5 again shows, to an enlarged scale.

Figure 5:
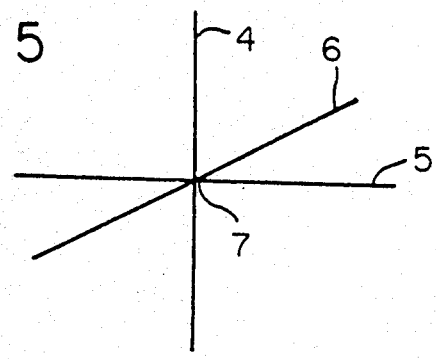
FIG. 5 shows the crossed axes corresponding to FIG. 4.
Figure 6:
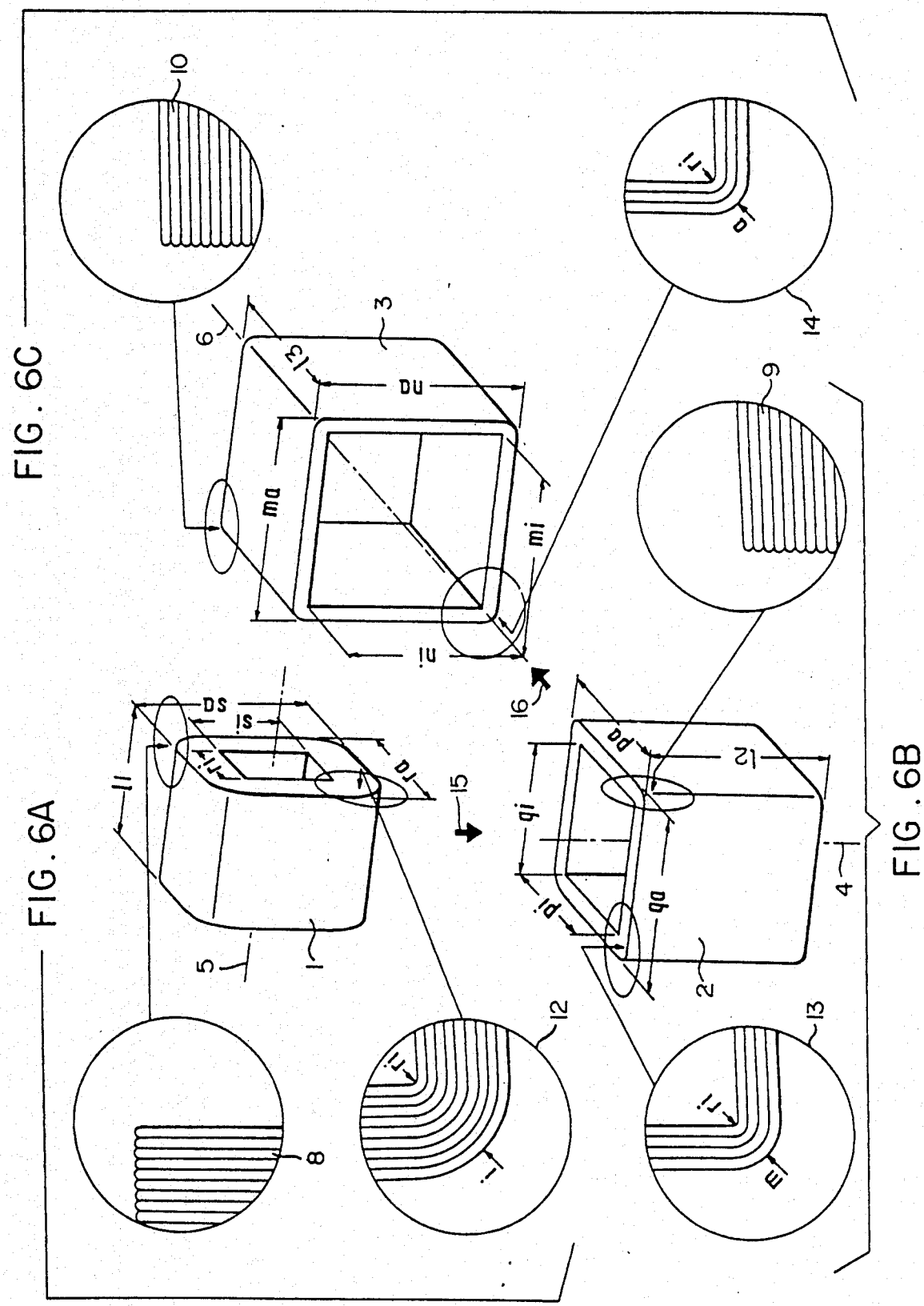
FIG. 6A, 6B and 6C illustrate embodiments of the present invention with three different sized cube coils, each larger one housing the next smaller one.

The construction of a cube-shaped probe in FIG. 6A, 6B and 6C is also characterized by a right-angled axis cross as in FIG. 5. In this case, there are three cubes, FIG. 6A, 6B and 6C respectively, which can be placed one inside the other, with the coils 1, 2 and 3. Each of these coils has turns 8, 9 and 10 whose perimeters become greater towards the outside.

These turns 8, 9, 10 are shown in frontal enlargement by the circles that are assigned reference numbers 12, 13 and 14, respectively. Their turn axes are 5, 4 and 6 corresponding to FIG. 5. For their assembly, the coil 1, which is the inner one, is moved along the arrow 15 to enter the space in the middle coil 2. This assembly is then moved along the arrow 16 into the space of the outer coil 3. By this the total assembly is performed.

If the number of turn layers remained constant, this would result in greater areas of cross-section of turns for the outside coils which would cause an anisotropy of the magnetic field. To compensate for this, the turn layers are correspondingly reduced. The extent of this reduction can easily be calculated from the outer and from the inner measures of the coil supports. The measurements for the inner coil are, outside $s_a$, $r_a$ and inside $s_i$, $r_i$. The support appears as a ring, which has the cross-section $$i = s_a \times r_a - s_i \times r_i.$$

Correspondingly this cross-section for the middle coil 2 is $$m = p_a \times q_a - p_i \times q_i.$$

and the cross-section for the outer coil 3 is $$a = m_a \times n_a - m_i \times n_i.$$

To these cross-sections the possible turns, tightly wound, are proportional so that the measurements are to be chosen for the equality $i = m = a$ to each other.

Figure 7:
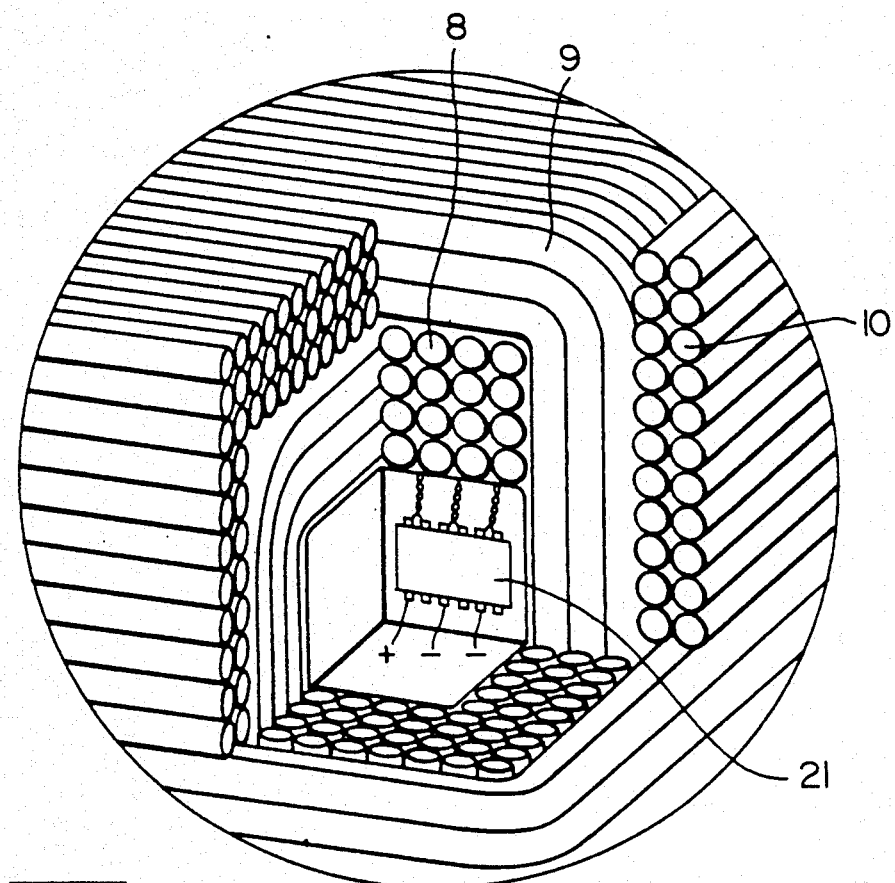
FIG. 7 is an enlarged cutout corner view of a cube wound according to FIG. 6.

Thus, the turns which can be seen in the respective corner regions i, m and n of coils 1, 2 and 3 and which are shown to an enlarged scale in the encircled diagrams 12, 13 and 14 have nine, four and three turn layers respectively. The end result of this is that all coils are given the same turn cross-sections. A corner region which is shown to an enlarged scale in FIG. 7 shows that the inner turns 8 are surrounded by the middle turns 9 which in turn are surrounded by the outer turns 10. This assembly is characteristic of a finished probe. It is particularly evident from this that advantageously according to the invention the turn cross-sections of the coil are tightly packed with turns.

FIG. 7 shows a micro-chip 21 attached to the inner wall of the hollow core of the inner coil for the purpose as described before. Pulse generator 22, which may be a square wave type or any other type currently in use in the art, is illustrated with a positive and a negative terminal, which may be connected to the respective terminals of micro-chip 21. The pulse generator that is used for the transmitter is characterized by the feature that short-term voltage peaks are to be generated for supplying the coils. The short-term duration of the peaks has the advantage that high currents may be used without any damage.

Figure 8:
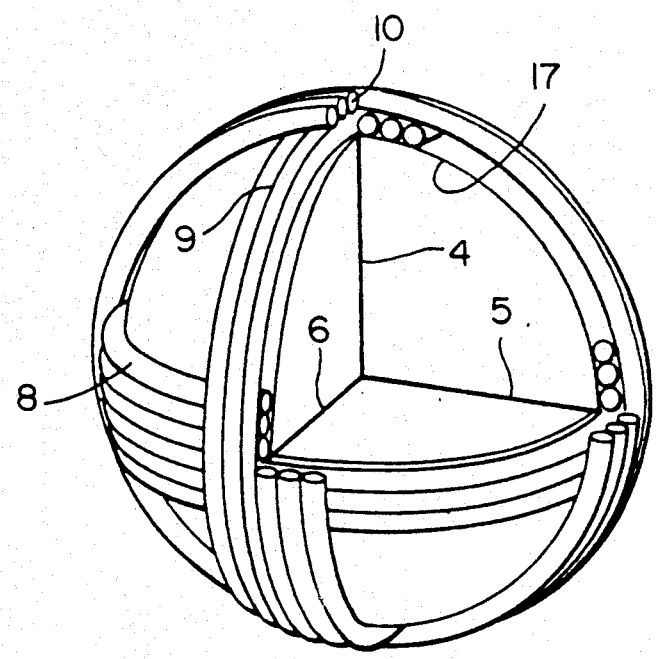
FIG. 8 is a cutaway view showing the arrangement of three coils in a sphere.
Figure 9:
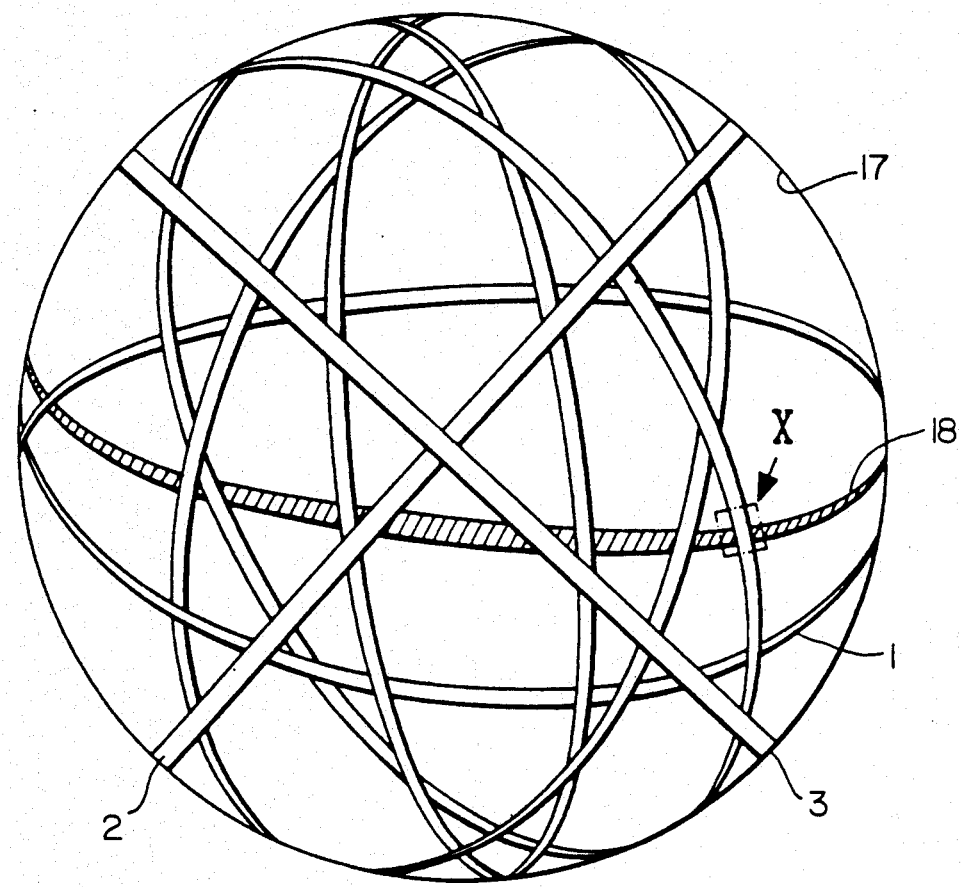
FIG. 9 is an elevational view showing the arrangement of a plurality of coils in a sphere.
Figure 10:
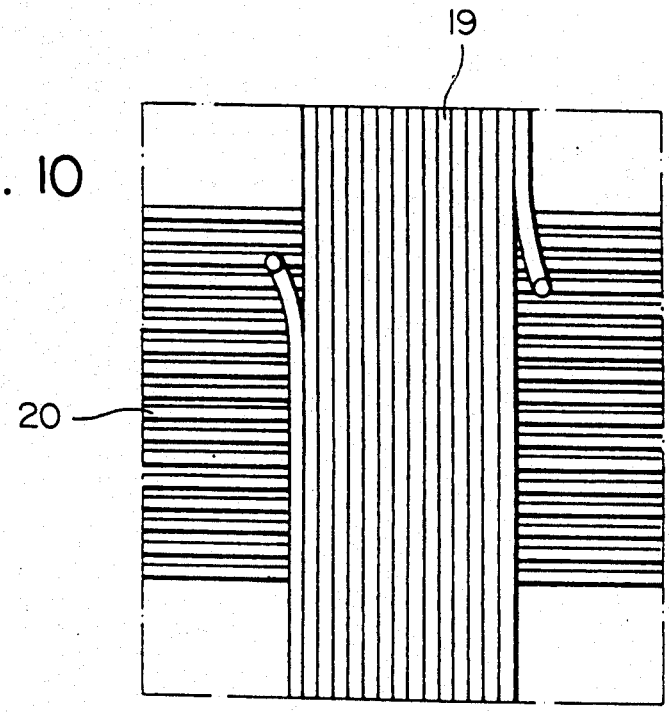
FIG. 10 is an exploded enlarged cutout view of a coil with a common tap for all the coils.

The individual coils may alternatively be wound around a sphere 17 as shown in FIG. 8 and FIG. 9, a cross of turn axis 4, 5, 6 as in FIG. 5, forming the basis of the embodiment in FIG. 8 while a multi-beamed star of axes forms the basis of the embodiment of FIG. 9. The overlapping is shown in FIG. 8 in respect to the successive turns 8, 9, 10, whereas FIG. 9 shows the overlapping in form of the coils 1, 2, 3, 18. For both examples FIG. 10 shows an exploded view in which it is evident that the upper turn layer 19 has fewer individual turns than the layer 20 underneath it in order to meet the requirements for a constant cross section of turn.

Calculations for the number of turns in accordance with geometrical conditions do not always produce a whole number, and since it is difficult to realize fractions of a turn, the turns are referred to the next-higher or next-lower number of turns. In order, however, not to cause any falsification of results thereby, in such cases the coils are operated with a differing strength of current. This means that a coil, in which a half turn too few has been wound, is acted upon by a correspondingly increased current. This increased current must be calculated in proportion to the missing portion of turn. Such a correction through current application is also to be undertaken when calibrations are to be carried out for particularly precise alignment. This is particularly important in the case of too few turns.

The signal wire tap of the coil wound on a sphere is effected in FIG. 8 in that there is a separate tap for each coil. In the arrangement of FIG. 9, on the other hand, a common, not necessarily equatorial signal wire tap is provided. The cutout of FIG. 10 shows where the two signal shunt wires are connected to the common tap. The other free paths are occupied by the wires of the other coils. Thus, for ten coils, the common signal shunt path must have 20 individual paths.

I claim

1. In an electromagnetic device for position measurement including at least one alternating voltage generator for the transmitter, at least one receiver, an inductive probe for transmission, and an inductive probe for reception, at least the probe for transmission having at least two coils with intersecting winding axes, the improvement wherein:

said probes have a plurality of intersecting winding axes;

the turn diameters of said at least two coils are greater when the distance from the center of the probe is greater than when the distance from the center of the probe is smaller;

the turns of said at least two coils have an identical area of cross-section; and the number of layers of turns of said at least two coils is reduced as the distance of the coils from the center of the probe is increased.

2. An electromagnetic device as claimed in claim 1, wherein:

three coils are provided; and the coil turns of coils other than the coil nearest the center of the probe enclose one another.

3. An electromagnetic device as claimed in claim 1, wherein:

three coils are provided having turns thereof wound around three axes perpendicular to each other;

a hollow core volume is provided in the center coil; and the other coils comprise an outer volume of the probe substantially filled by the turns of said other coils.

4. An electromagnetic device as claimed in claim 1, wherein each of said at least two coils includes a core constructed in the form of a cube, and the turns thereof enclose rectangular interior spaces.

5. An electromagnetic device as claimed in claim 1, wherein the coils each have a hollow core.

6. An electromagnetic device as claimed in claim 5, wherein:

one or more IC-chips for selective coil drive are disposed in the hollow core area.

7. An electromagnetic device as claimed in claim 1, wherein the probe is of corresponding construction both for its performance as a transmitter and for its performance as a receiver.

8. An electromagnetic device as claimed in claim 1, wherein the turns of each of said at least two coils include
windings corresponding to the maximum circles on
a sphere.

9. An electromagnetic device as claimed in claim 1, wherein
the turn layers of each of said at least two coils are alternately lapped and additional turn layers are disposed between the turn layers of other coils.

10. An electromagnetic device as claimed in claim 1, and further comprising:
pulse generator means for the probe of the transmitter for producing recurring, short-term voltage peaks by means of which the coils are triggered.

* * * * *